US009547341B2

(12) United States Patent
Aono (10) Patent No.: US 9,547,341 B2
(45) Date of Patent: Jan. 17, 2017

(54) INFORMATION PROCESSING APPARATUS (71) Applicant: Sony Corporation, Tokyo (JP)

(72) Inventor: Tatsuhito Aono, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 577 days.

(21) Appl. No.: 14/068,803

(22) Filed: Oct. 31, 2013

(65) Prior Publication Data

US 2015/0116917 A1    Apr. 30, 2015

(51) Int. Cl.
G06F 1/16    (2006.01)

(52) U.S. Cl.
CPC ........... *G06F 1/1681* (2013.01); *G06F 1/1615* (2013.01); *G06F 1/1641* (2013.01); *G06F 1/1649* (2013.01)

(58) Field of Classification Search
CPC .............................. G06F 1/1649; G06F 1/1681
USPC .............................................. 248/291.1, 372
See application file for complete search history.

(56) References Cited

U.S. PATENT DOCUMENTS

| 2003/0221288 | A1* | 12/2003 | Kim ....................... F16M 11/10 16/337 |
| 2007/0090249 | A1* | 4/2007 | Lu .......................... G06F 1/1616 248/291.1 |
| 2007/0252059 | A1* | 11/2007 | Katsumata ........... H04N 9/3141 248/278.1 |
| 2008/0105073 | A1* | 5/2008 | Sawai ..................... F16M 11/08 74/425 |
| 2009/0268107 | A1* | 10/2009 | Shimizu .................. F16D 7/021 348/836 |
| 2011/0062304 | A1* | 3/2011 | Hsieh ..................... F16M 11/00 248/372.1 |
| 2011/0149510 | A1* | 6/2011 | Monsalve .............. F16M 11/10 361/679.55 |
| 2011/0195760 | A1* | 8/2011 | Carmonius ........... G06F 1/1624 455/575.4 |
| 2012/0102675 | A1* | 5/2012 | Lee ........................ G06F 1/1681 16/243 |
| 2012/0139815 | A1 | 6/2012 | Aono et al. |
| 2013/0160244 | A1* | 6/2013 | Sayama ..................... E05D 3/18 16/370 |
| 2013/0200240 | A1* | 8/2013 | Lindblad ................... F16F 3/04 248/372.1 |
| 2014/0217875 | A1* | 8/2014 | Park ...................... H05K 5/0226 312/326 |

(Continued)

Primary Examiner — David Warren
(74) Attorney, Agent, or Firm — Oblon, McClelland, Maier & Neustadt, L.L.P.

(57) ABSTRACT

An information processing apparatus includes a first case and a second case. A connection assembly connects the first case to the second case such that the cases are rotatable about a shaft member disposed in the connection assembly. The connection assembly includes a first link member attached at one end to the first case and at another end to a second link member included in the second case, and a spring assembly attached at one end to the second link member and at another end to the second case. A torque is generated by the connection assembly relative to the shaft member in a direction corresponding to one or more of a closed state and an open state. The torque is generated in the direction corresponding to the closed state when respective front surfaces of the cases are separated by less than a predetermined polar angle.

16 Claims, 11 Drawing Sheets (56) References Cited

U.S. PATENT DOCUMENTS

| | | | | |
|---|---|---|---|---|
| 2014/0321041 A1* | 10/2014 | Hsu | ................ | G06F 1/1637 |
| | | | | 361/679.26 |
| 2015/0116917 A1* | 4/2015 | Aono | ................ | G06F 1/1681 |
| | | | | 361/679.04 |
| 2015/0138713 A1* | 5/2015 | Onda | ................ | G06F 1/1679 |
| | | | | 361/679.27 |

* cited by examiner

INFORMATION PROCESSING APPARATUS

BACKGROUND

Technical Field

The present disclosure relates to information processing apparatuses and related apparatus enclosures.

Description of Related Art

Mobile terminal devices such as smart phones typically have dimensions of approximately 4 inches by 6 inches. While devices of this size may be conveniently portable, displays included in such devices may make viewing content on the devices difficult and unenjoyable. For this reason, mobile terminal devices having multiple displays have been introduced. For example, a mobile terminal device may have two or more displays connected at a hinge such that the displays may be folded for storage and/or portability, and opened for viewing content on the plurality of displays.

SUMMARY

According to one aspect of the present disclosure, an information processing apparatus includes a first case and a second case. A connection assembly connects the first case to the second case such that the cases are rotatable about a shaft member disposed in the connection assembly. The connection assembly includes a first link member attached at one end to the first case and at another end to a second link member included in the second case, and a spring assembly attached at one end to the second link member and at another end to the second case. A torque is generated by the connection assembly relative to the shaft member in a direction corresponding to one or more of a closed state and an open state. The torque is generated in the direction corresponding to the closed state when respective front surfaces of the cases are separated by less than a predetermined polar angle.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1:
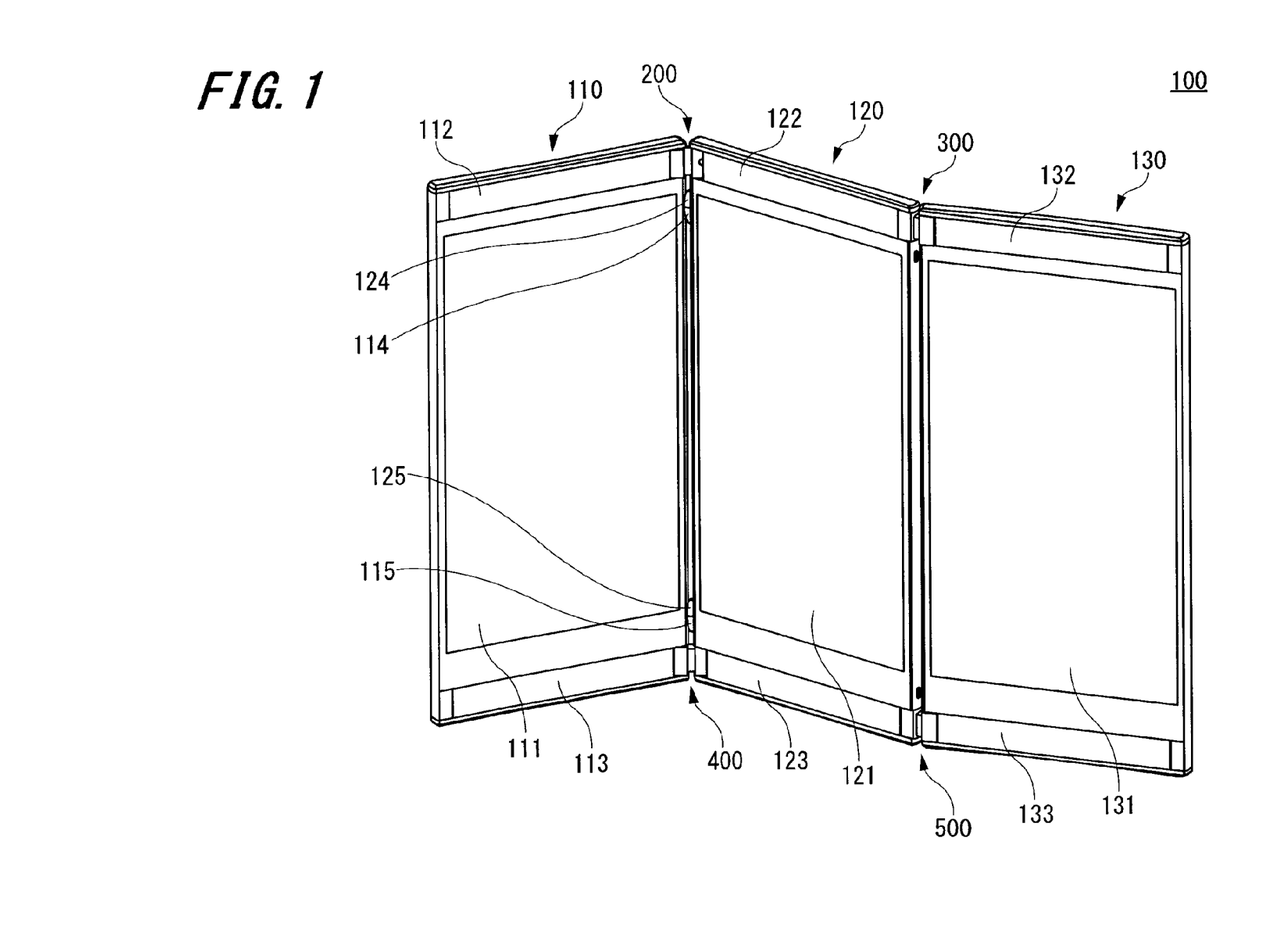
FIG. 1 illustrates an exemplary information processing apparatus from a front perspective according to one aspect of the present disclosure.

Referring first to FIG. 1, FIG. 1 illustrates an exemplary information processing apparatus viewed from a front perspective. The information processing apparatus 100 illustrated in FIG. 1 is provided with a first case 110, a second case 120, and a third case 130. The first case 110 is provided with a display panel 111. The second case 120 is provided with a display panel 121. The third case 130 is provided with a display panel 131. The display panels 111, 121, and 131 may, in certain aspects of the present disclosure, be liquid crystal displays (LCD), or other suitable display screen technology. In addition to displaying images and other associated content, the display panels may display operational inputs, such as numbers or icons, which may be used for control of the information processing apparatus 100. The display panels may additionally display a graphical user interface with which a user may control aspects of the information processing apparatus 100.

The three display panels 111, 121, and 131 are preferably of similar dimensions; however, this is not limiting. Moreover, while the exemplary embodiment of the information processing apparatus 100 shown in FIG. 1 includes a display panel in each respective case 110, 120, and 130, this is also not limiting. For example, one or more of the cases 110, 120, and 130 may include an input interface, such as a keyboard, that the user can enter commands and other textual inputs.

In the example of FIG. 1, the display panel 111 is centered on a front surface of the first case 110 such that an upper end part 112 of the first case 110 is above the display panel 111 and a lower end part 113 of the first case 110 is below the display panel 111. Similarly, the display panel 121 is centered between an upper end part 122 and a lower end part 123 on the second case 120, and the display panel 131 is centered between an upper end part 132 and a lower end part 133 on the third case 130. In certain aspects of the present disclosure, various circuitry associated with control, communication, and/or operational processing features of the information processing apparatus 100 may be stored within spacing in the upper and lower end parts of each respective case of the information processing apparatus 100. For example, communication components such as antennas and other wireless transmitters and/or receivers may be housed in the upper end part 112 of the first case 110. As a further example, peripheral components such as a speaker may be housed in the upper end part 132 of the third case 130. As a further example, a microphone may be housed in the lower end part 133 of the third case 130 such that audio inputs may be received and processed by the information processing apparatus 100. As a further example, a spring assembly included in a connection assembly may be housed in the upper end part 122 of the second case 120. Aspects of the spring assembly and related aspects of a connection assembly will be discussed in detail in later paragraphs.

In certain aspects of the present disclosure, the display panels 111, 121, and 131 may function as a single continuous display panel. That is, an image processing circuit included in the information processing apparatus 100 may divide content to be displayed on each of the display panels 111, 121, and 131, such that the divided content may be displayed on the three display panels to create a larger "complete" display screen when the information processing apparatus 100 is in an open state. Conversely, the cases 110, 120, and 130 may be folded such that the information processing apparatus 100 shown in FIG. 1 is effectively one-third the size of the example shown in the figure.

Figure 2:
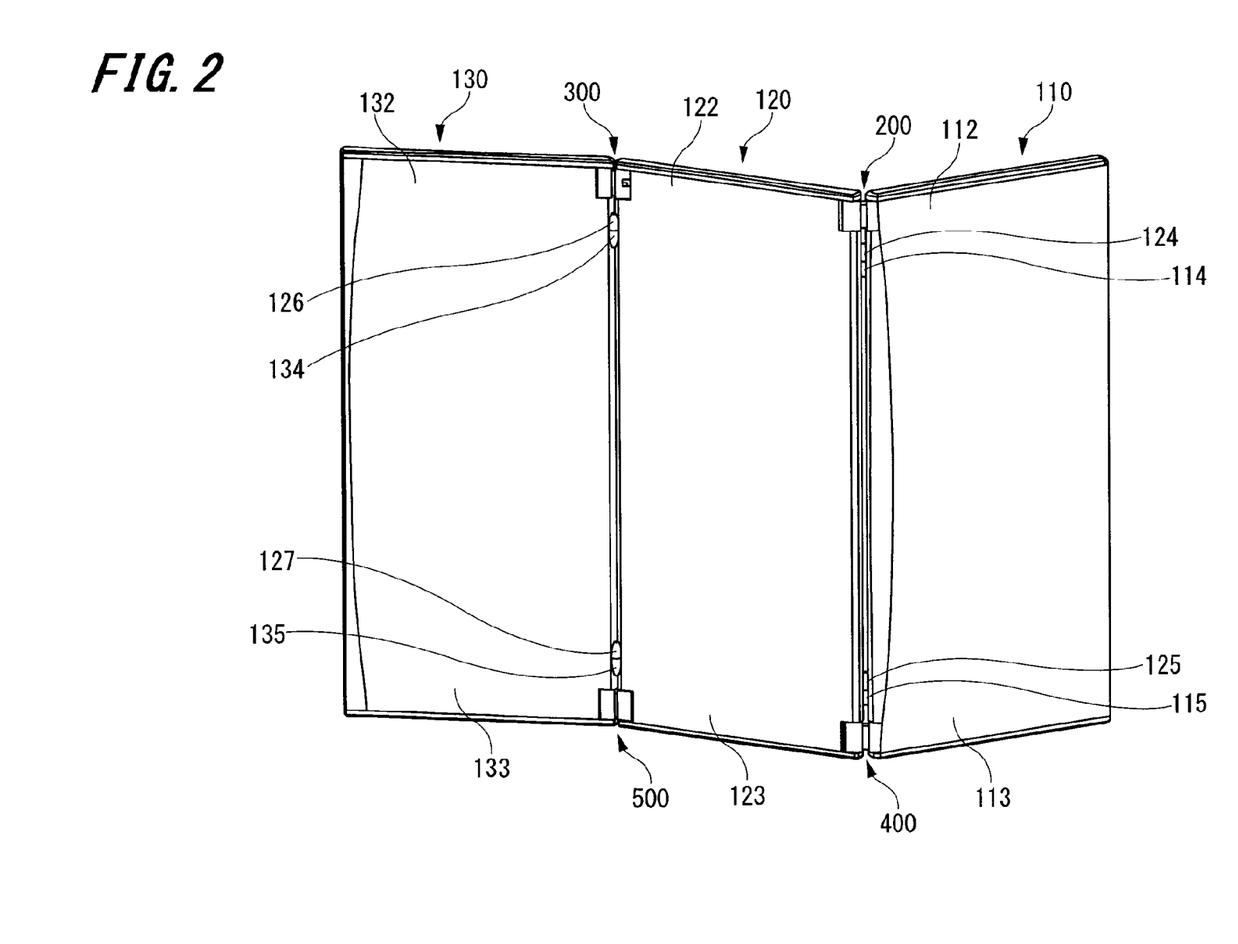
FIG. 2 illustrates an exemplary information processing apparatus from a rear perspective according to one aspect of the present disclosure.

Next, FIG. 2 illustrates a rear perspective of the exemplary information processing apparatus shown in FIG. 1. As illustrated in the example at FIG. 2, each of the cases 110, 120, and 130, may share at least two points of contact with their respective adjacent cases, e.g., at the upper end part and the lower end part of the respective cases. Specifically, the first case 110 is connected with the second case 120 at connection assemblies 200 and 400, including shaft assemblies formed by shaft supports 114 and 124 at the upper end 112 and shaft supports 115 and 125 at the lower end 113. Similarly, the second case 120 is connected to the third case 130 at connection assembly 300, including a shaft assembly with shaft supports 126 and 134 at the respective upper end parts of the second and third cases, and a connection assembly 500 including a second shaft assembly formed by shaft supports 127 and 135 at the lower end of the cases.

As will be discussed in greater detail in later paragraphs, the shaft assemblies formed at the upper and lower ends of the respective cases may each include a shaft member such that the respective cases may rotate about the shaft member. Moreover, as will be discussed in greater detail in later paragraphs, the connection assemblies illustrated in FIG. 2 may include various elements for generating a torque (e.g., relative to the shaft member) such that the information processing apparatus is maintained in a close state or an open state. Further, in certain aspects of the present disclosure, the connection assemblies (e.g., connection assemblies 400 and 500) may include a flexible circuit board arranged within the connection assemblies to form an electrical connection between the cases.

Figure 3:
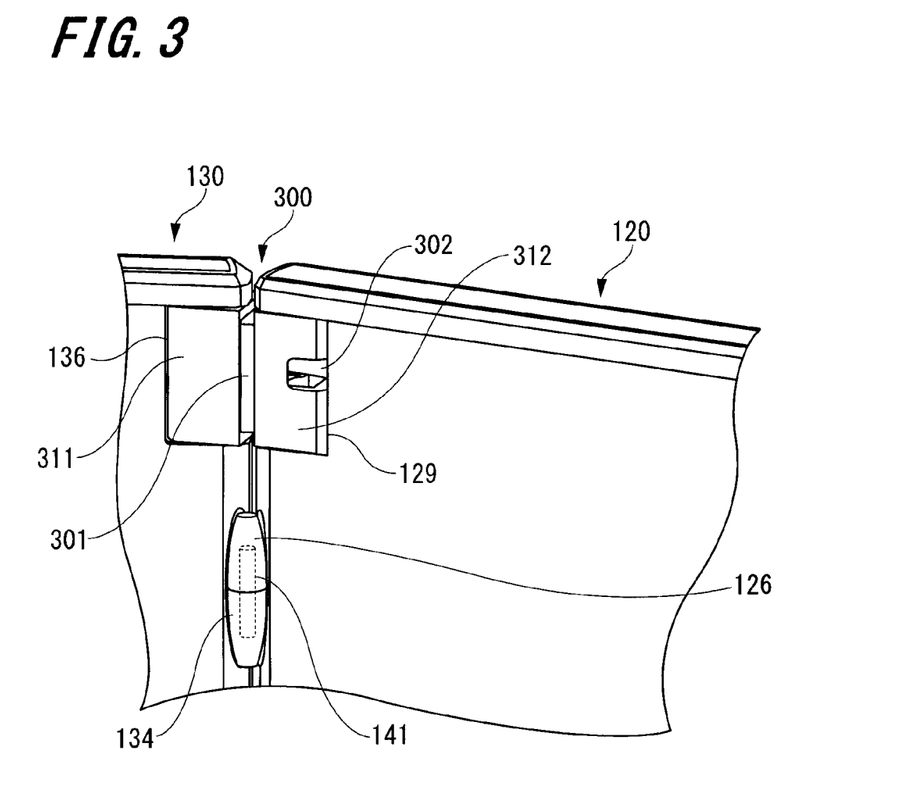
FIG. 3 illustrates an enlarged view of an exemplary connection assembly according to one aspect of the present disclosure.

Next, FIG. 3 illustrates an enlarged view illustrating an exemplary connection assembly according to one aspect of the present disclosure. Referring to FIG. 3, the second case 120 is connected to the third case 130 by a connection assembly 300 that includes shaft supports 126 and 134. A shaft member 141 is included within the shaft supports 126 and 134. The shaft assembly formed by the shaft supports 126 and 134 in the shaft member 141 permits the second case 120 and the third case 130 to rotate freely about the shaft member 141 (e.g., in response to a torque generated relative to the shaft member 141). While not shown in FIG. 3, it is assumed for the purposes of the present example that similar shaft assemblies connect the respective cases 110, 120, and 130 at both lower and upper ends of the cases such that the cases may rotate freely about the respective shaft members. Therefore, for the sake of brevity a description of the other shaft assemblies connecting the respective cases is omitted.

Referring back to the connection assembly 300 shown in FIG. 3, the exemplary connection assembly 300 includes a first link member 301 and a second link member 302, which are respectively housed at a step 136 and a step 129. The first and second link members 301 and 302 are respectively enclosed within the cases by a cover 311 and a cover 312. It is assumed for the purposes of the present example that the connection assembly 200 is substantially the same in structure as the connection assembly 300 shown in FIG. 3. Therefore, for the sake of brevity a detailed description of the connection assembly 200 is omitted.

Figure 4:
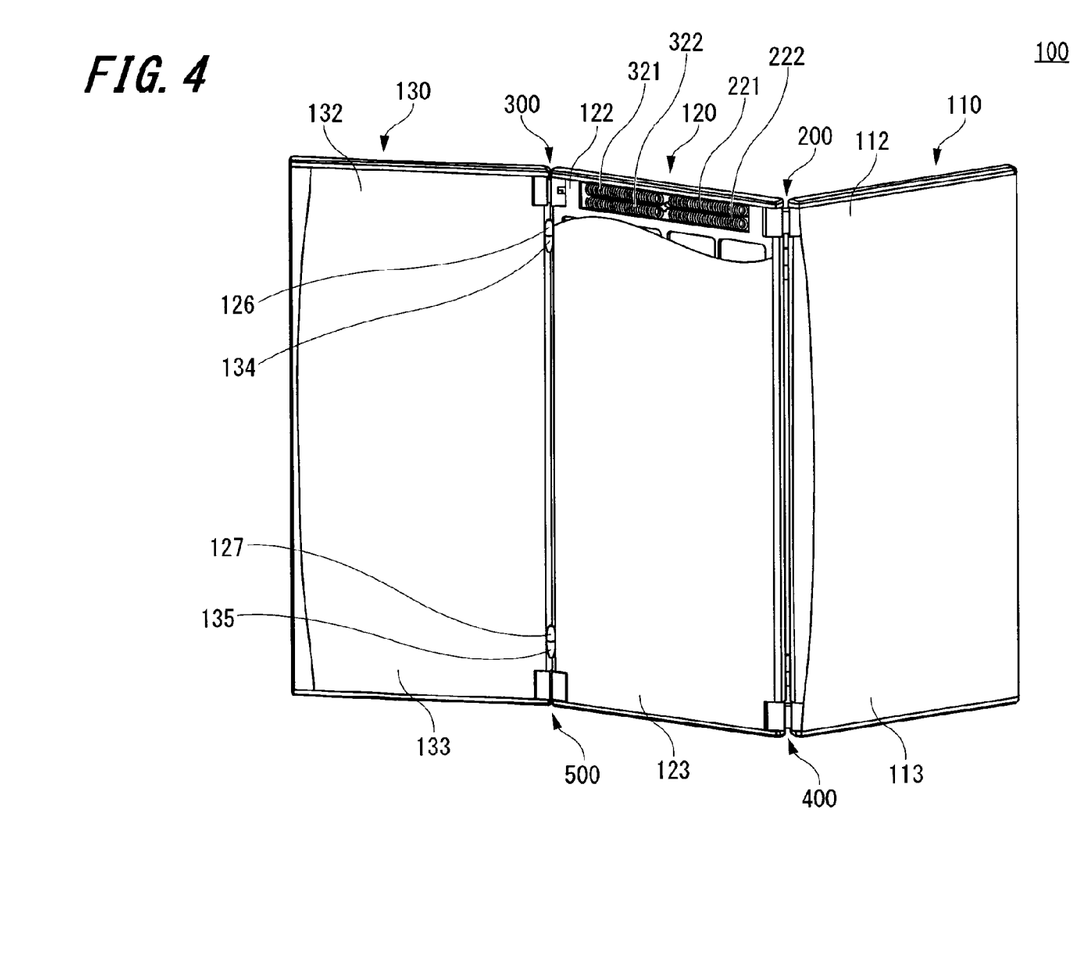
FIG. 4 illustrates an exemplary arrangement of a spring assembly in an information processing apparatus according to one aspect of the present disclosure.

Next, FIG. 4 illustrates exemplary spring assemblies which are included in the connection assemblies connecting the first case 110, the second case 120, and the third case 130. In the example shown in FIG. 4, four springs are arranged in parallel within the upper end part 122 of the second case 120. In certain aspects of the present disclosure, springs 221 and 222 may make up a first spring assembly included in connection assembly 200, and springs 321 and 322 may make up a second spring assembly included in connection assembly 300.

With respect to the exemplary structure of the connection assembly 300, in one aspect of the present disclosure, the springs 321 and 322 making up a spring assembly may be connected at one end to the second case 120 and at an opposing end to the second link member 302 included within the connection assembly 300 (e.g., within case 130). Similarly, the springs 221 and 222 forming a spring assembly may be connected at one end to the second case 120 and at an opposing end to another link member included in the connection assembly 200 (e.g., in case 110).

Figure 5:
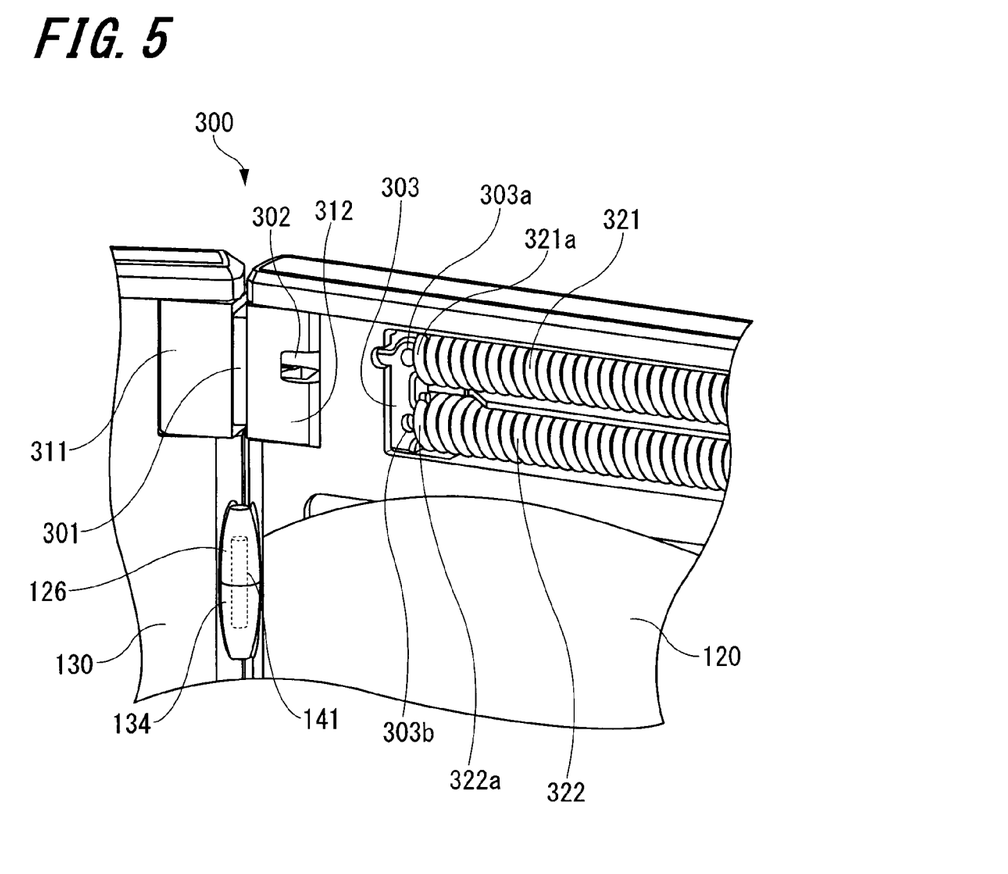
FIG. 5 illustrates an exemplary enlarged view of a connection assembly including a spring assembly according to one aspect of the present disclosure.

Next, FIG. 5 illustrates aspects of an exemplary spring assembly included within a connection assembly according to one aspect of the present disclosure. Specifically, FIG. 5 illustrates a spring assembly formed by springs 321 and 322 included as part of the connection assembly 300. According to the example shown in FIG. 5, the respective ends 321*a* and 322*a* of springs 321 and 322 are connected at spring attachment parts 303*a* and 303*b* of a joint 303 included as part of the connection assembly 300. The joint 303 is connected to the second link member 302, which is connecting the second case 120 to the third case 130 via the first link member 301. Thus, the connection of the spring assembly including the springs 321 and 322, and the connection of the link members 301 and 302 may generate a torque around the shaft member 141 such that the cases 120 and 130 rotate about the shaft member 141 in a closing or opening direction.

Figure 6:
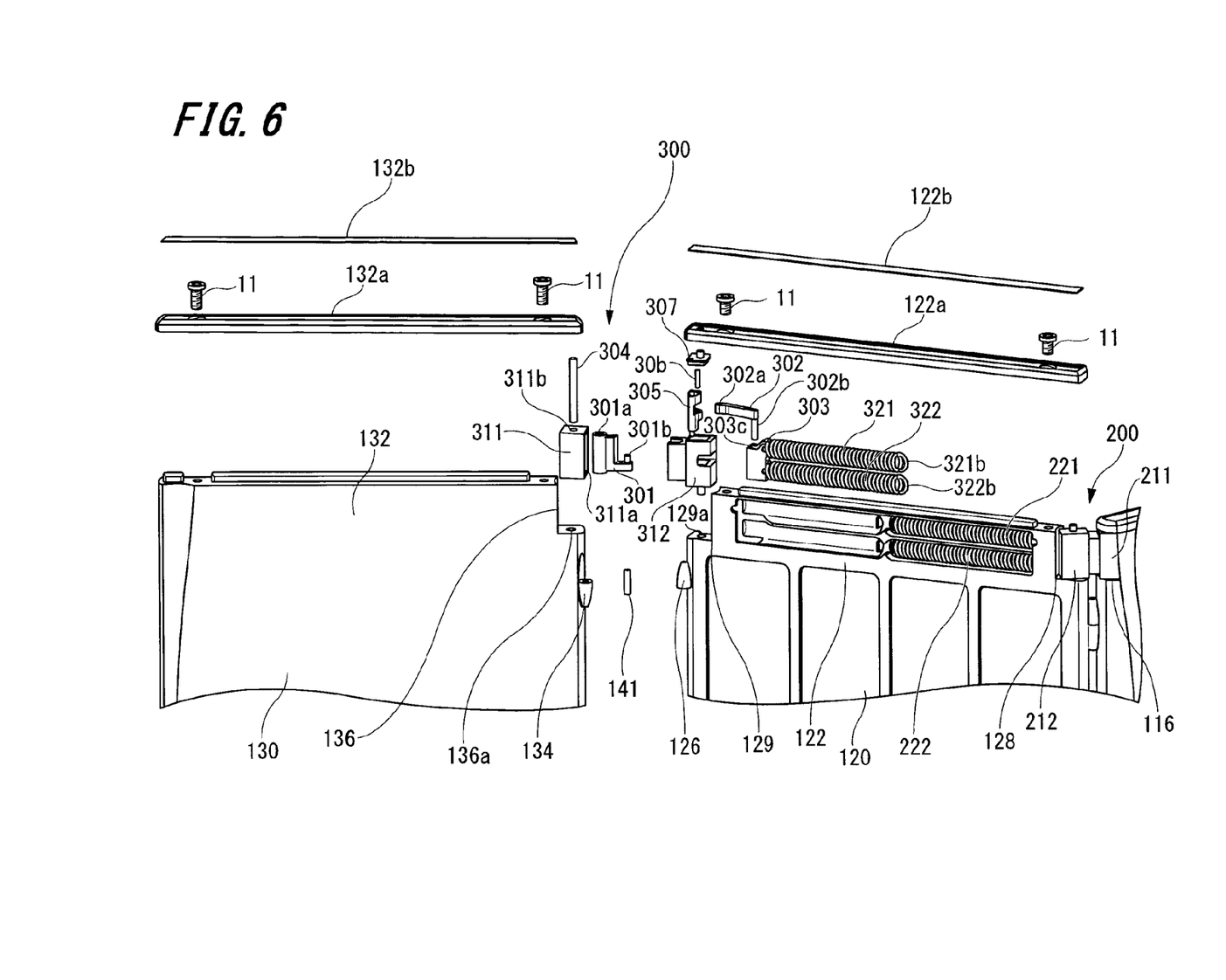
FIG. 6 illustrates an exploded view of an exemplary connection assembly according to one aspect of the present disclosure.
Figure 7:
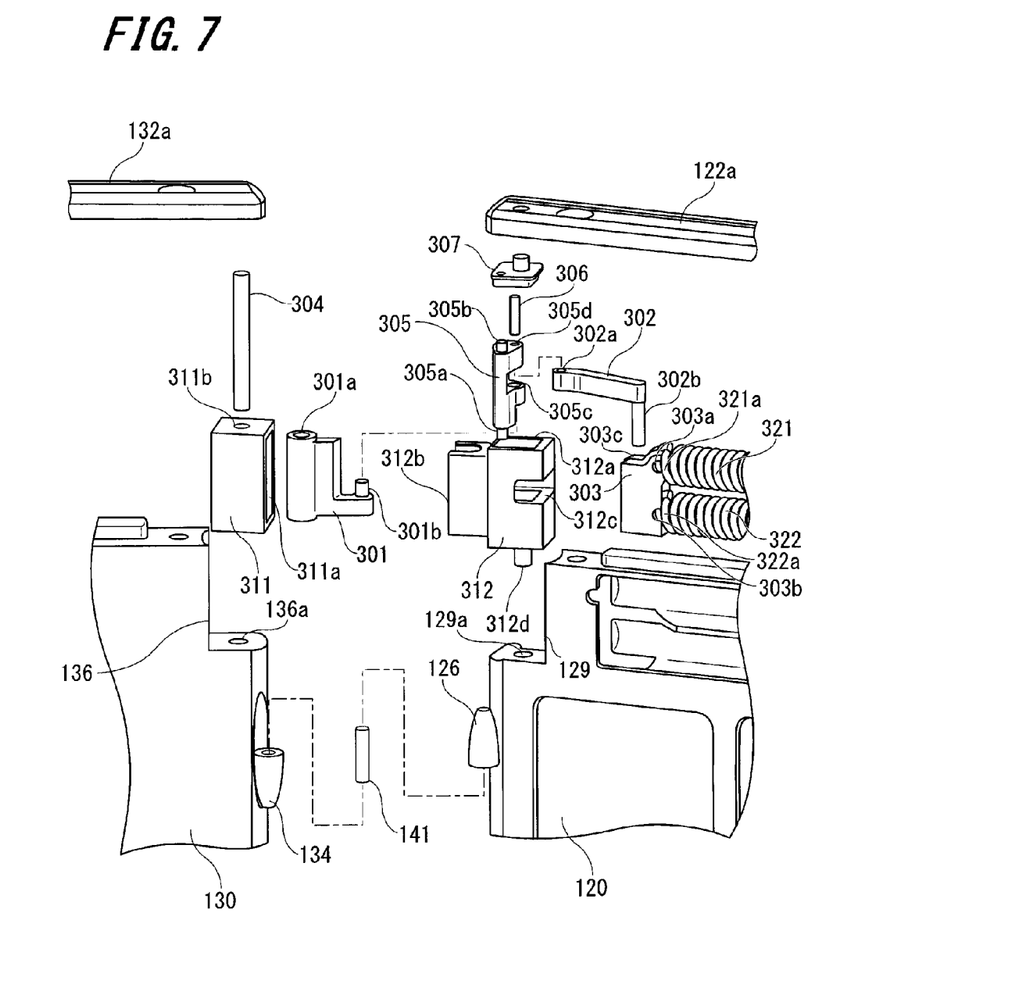
FIG. 7 illustrates an enlarged view of the exemplary connection assembly of FIG. 6.

Next, FIG. 6 illustrates an exploded view illustrating features of an exemplary connection assembly according to one aspect of the present disclosure, and FIG. 7 illustrates an enlarged view of the connection assembly shown in FIG. 6. Aspects of the connection assembly 300 illustrated in FIGS. 6 and 7 will now be discussed with reference to both FIGS. 6 and 7.

In the second case 120, a projection 312*d* of a lower end of the cover 312 fits in a hole 129*a* provided in the step 129 of the upper end part 122. The cover 312 has openings 312*a*, 312*b*, and 312*c*. The three openings 312*a*, 312*b*, and 312*c* are, in certain aspects of this present disclosure, interconnected within the cover 312. A joint 305 is arranged at the opening 312*a* of the cover 312. A projection 305*a* below the joint 305 fits in a hole in the opening 312*a* of the cover 312. A projection 305*b* above the joint 305 is supported by shaft support member 307. The joint 305 connects the first link member 301 and the second link member 302. That is, shaft member 306 fits in hole 305*d* of the joint 305, and the hole 302*a* of the second link member 302. In the first link member 301, the projection 301*b* fits in hole 305*c* of the joint 305. The projection 302*b* of the second link member 302 fits in hole 303*c* of joint 303. In the joint 303, ends 321*a* and 322*a* of the springs 321 and 322 are attached to the spring attachment parts 303*a* and 303*b*. Opposing ends 321*b* and 322*b* of the springs 321 and 322 are attached to the second case 120. The first link member 301 is arranged within the opening 311*a* of the cover 311. The shaft member 304 fits in hole 311b of the cover 311, the hole 301a of the first link member 301, and the hole 136a of the step 136 of the third case 130. A cap 122a is attached to an upper surface of the second case 120 via screws 11. A belt 122b is attached atop the cap 122a. Similarly, a cap 132a is attached atop the third case 130, and a belt 132b is attached atop the cap 132a.

Figure 8:
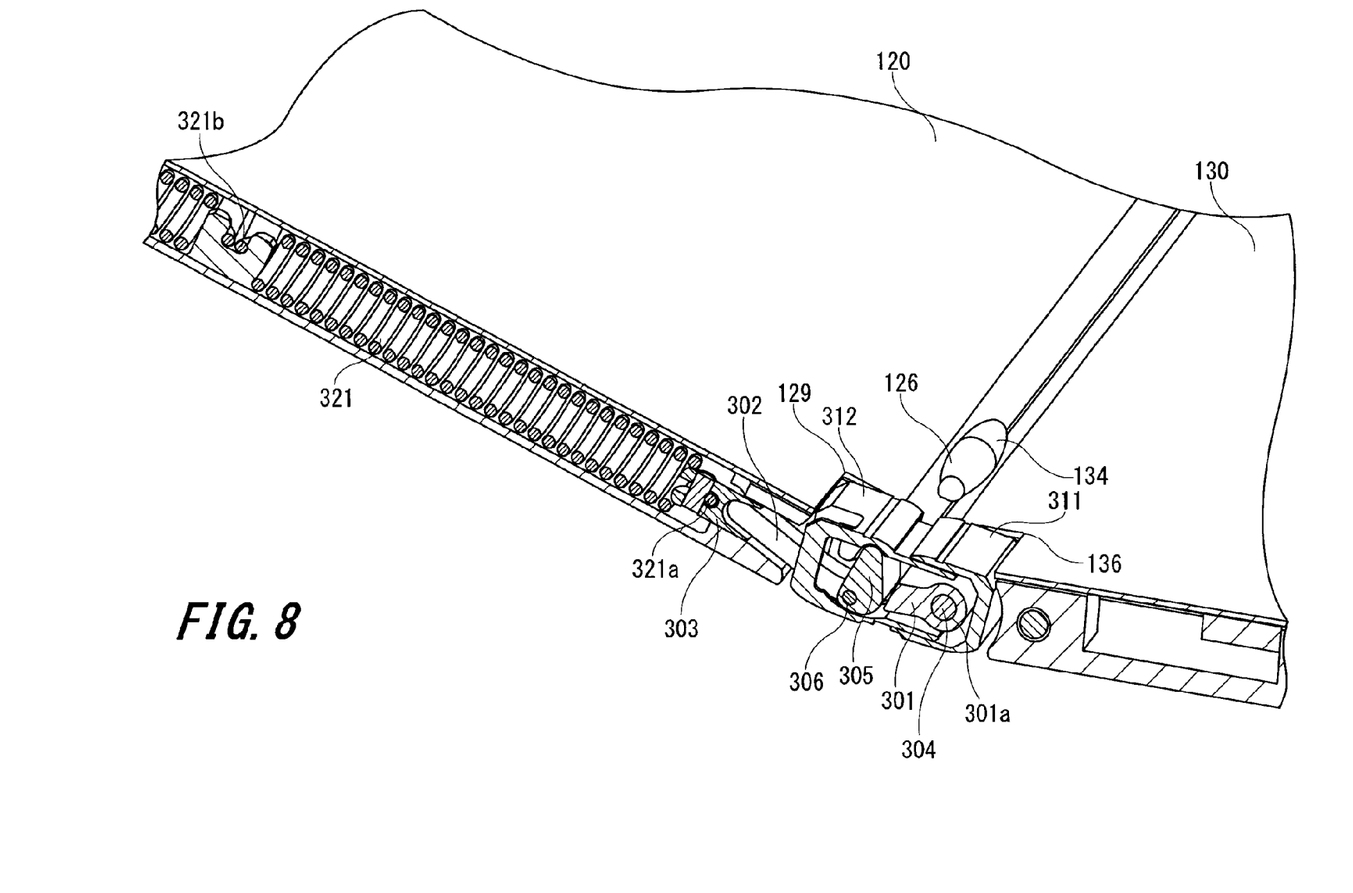
FIG. 8 illustrates a cross-sectional view of an exemplary connection assembly.

Next, FIG. 8 illustrates an exemplary cross-sectional view of the connection assembly 300. The example illustrated in FIG. 8 assumes a perspective from an upper end of the information processing apparatus 100. Referring to the figure, the end 321a of the spring 321 is connected with the second link member 302 via the joint 303. Opposing end 321b of the spring 321 is connected to the second case 120. The second link member 302 is connected with the first link member 301 via the joint 305. The first link member 301 is connected with the third case 130 via the shaft member 304 attached to the hole 301a. As will be discussed and illustrated in later examples, a force exerted by the spring assembly including the spring 321 may be translated into a torque such that the second case 120 and the third case 130 may rotate about the shaft assembly formed by shaft supports 126 and 124 and the shaft member 141. Additionally, a direction of the torque may be determined by a relative position of the first and second link members with respect to the shaft member 141. In particular, in certain aspects of the present disclosure, the link members 301 and 302 may be movable (e.g., pivotable) about their respective connection points to the second and third cases such that a rotation of the second and third cases may result in the link members moving (e.g., pivoting) while the force exerted by the spring 321 changes, thereby resulting in the direction and/or the magnitude of the torque around the shaft assembly changing.

Next, FIGS. 9 through 14 illustrate an exemplary information processing apparatus transitioning from a closed state to an open state according to one aspect of the present disclosure.

Figure 9:
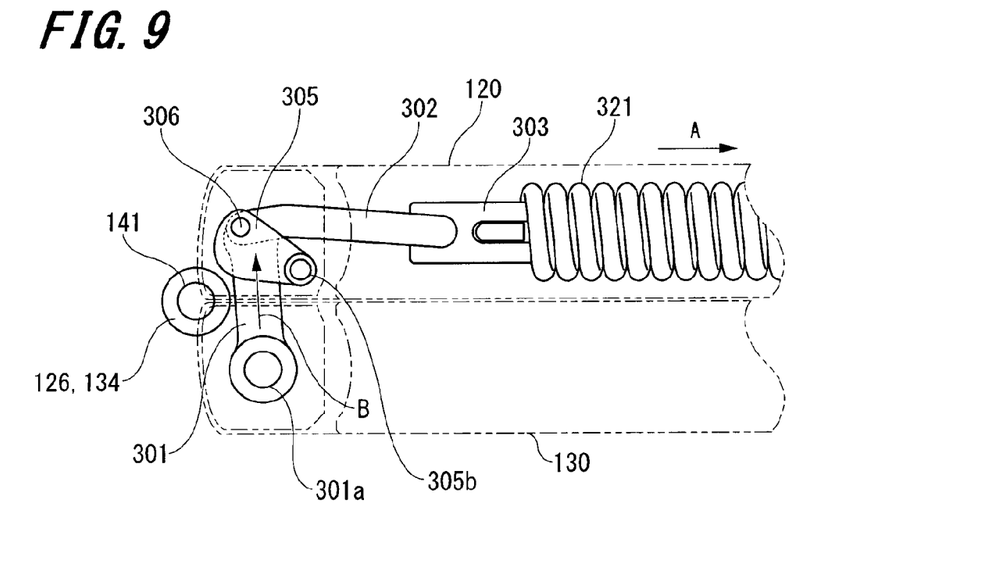
FIGS. 9-14 illustrate an operation of an exemplary connection assembly from a closed state to an open state.

Referring first to FIG. 9, FIG. 9 illustrates an exemplary information processing apparatus in a closed state. According to the example illustrated in FIG. 9, the two cases 120 and 130 are connected by a connection assembly including a shaft assembly formed by shaft supports 126 and 134 and shaft member 141. The information processing apparatus 100 may be transitioned to the closed state shown in FIG. 9 to an open state shown in subsequent figures by rotating one or more of the case 120 and/or the case 130 about the shaft member 141 (e.g., similar to opening a book). FIG. 9 also illustrates elements of the connection assembly 300. The second link member 302 is under tension generated in the state shown in FIG. 9 via a force A generated by the springs 321 and 322. Furthermore, a force B, which arises from the connection of the second link member 302 and the first link member 301, is a force that places the first link member 301 under tension. The combination of forces A and B is translated to a torque generated around the shaft member 141. In the exemplary arrangement illustrated in FIG. 9, the combination of force A and B is translated into the torque around the shaft member 141, and the torque is in a direction corresponding to the closed state of the information processing apparatus 100. In other words, a direction of the generated torque resulting from the forces generated by the spring 321 and the connection between the first and second link members 301 and 302 results in a torque about the shaft member 141 such that the case 120 and the case 130 are closed (i.e., a front surface of the second case 120 and a front surface of the third case 130 directly oppose each other, such as in the example of FIG. 9). Therefore, as a result of the generated torque within the information processing apparatus 100, the information processing apparatus is maintained in a closed state whereby a decreased overall size of the information processing apparatus in the closed state results in improved portability of the information processing apparatus 100.

Figure 10:
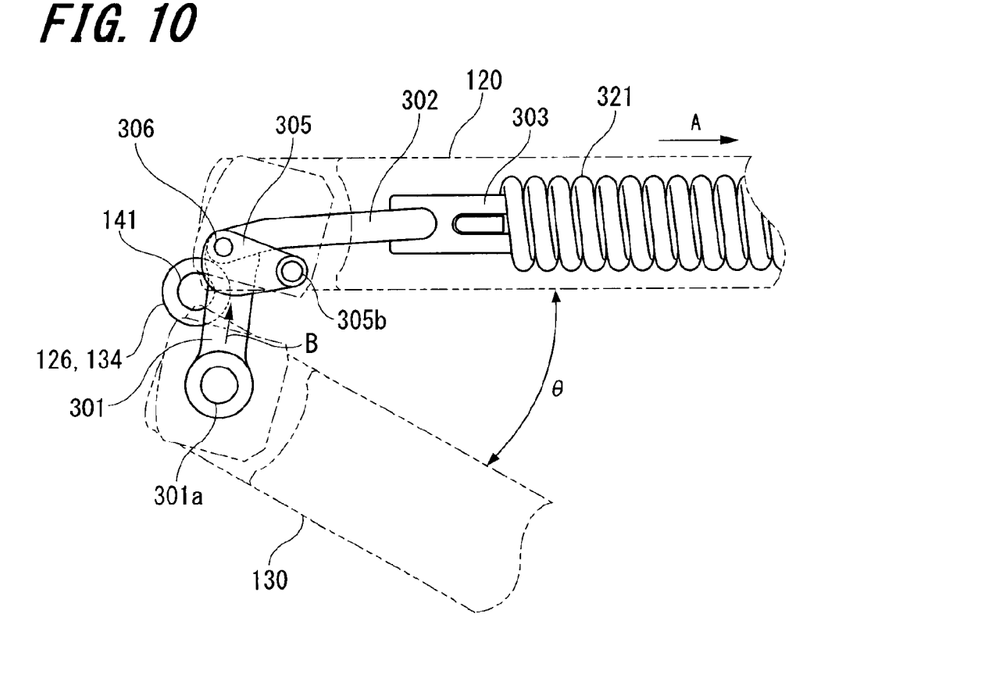

Next, FIG. 10 illustrates the information processing apparatus 100 transitioning from the closed state illustrated in FIG. 9 to a condition in which the cases 120 and 130 are opened at approximately a 35° polar angle with respect to each other. The polar angle separating the front surface of the case 120 and the case 130 is represented herein as angle θ. As a result of the movement of the second case 120 and the third case 130 in this example, the first and second link members move both with respect to the cases to which they are attached, as well as with respect to the shaft member 141. Additionally, as a result of the transition from the closed state, the force exerted by the springs 321 and 322 also changes. Consequently, at least one of a direction and/or a magnitude of the force B changes due to the transition illustrated in FIG. 10. Therefore, the change in the direction and/or magnitude of the force B may also result in a change in a direction and/or magnitude of the torque generated around the shaft member 141. In the example shown in FIG. 10, the direction and magnitude of the force B remains in the closed state direction, and is of a sufficient magnitude to generate a torque around the shaft member 141 such that the direction of the torque corresponds to the closed state illustrated in FIG. 9. In other words, as a result of the torque generated around the shaft member 141 according to the example of FIG. 10, the information processing apparatus 100 in the state shown in FIG. 10, assuming no other external forces are acting upon the information processing apparatus 100, would transition from a 35° open state to a closed state as a result of the torque.

Figure 11:
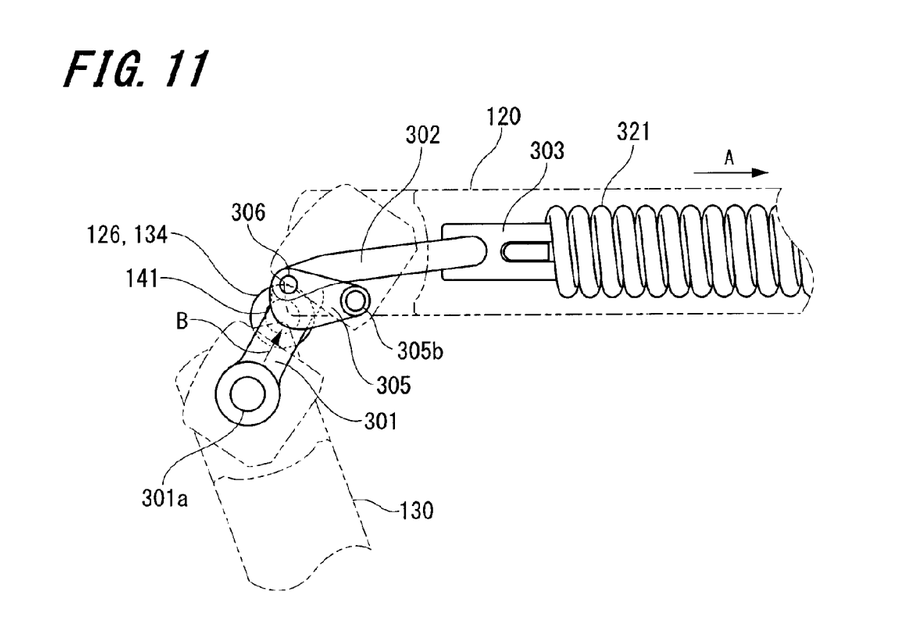

Next, FIG. 11 illustrates an example in which the second case 120 and the third case 130 are separated by a polar angle θ of approximately 70°. As discussed above in the example of FIG. 10, the movement of the second and third cases 120 and 130 with respect to each other results in the first and second link members 301 and 302 moving with respect to the shaft member 141 and with respect to the attachment positions on the link members' respective cases. Referring to the example of FIG. 11, when the two cases 120 and 130 are opened at a 70° polar angle, the force B placing the first link member 301 under tension is substantially directed in a corresponding direction of an alignment axis formed by the shaft member 141 and the attachment positions of the first and second link members 301 and 302 with their respective cases (e.g., shaft member 306 and hole 301a). As a result of the direction of the force B substantially corresponding with the alignment axis, the translated torque around the shaft member 141 is substantially zero. In this case, absent other external forces acting upon the apparatus, the information processing apparatus 100 may be maintained in the condition illustrated in FIG. 11.

Figure 12:
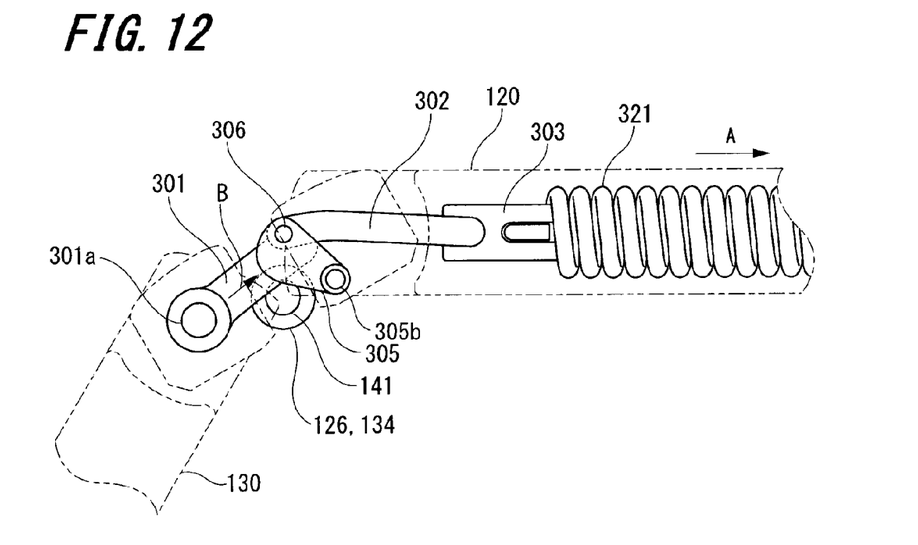

Next, FIG. 12 illustrates a state in which the second case 120 and a third case 130 are opened at an approximate polar angle θ of 120° with respect to each other. When the second and third cases 120 and 130 are opened at 120° as in the example shown in FIG. 12, the torque generated around the shaft member 141 as a result of the translation of the force B is in a direction corresponding to an open state of the information processing apparatus 100. As illustrated in FIG. 12, as a result of the second and third cases 120 and 130 being opened at 120°, the direction of the force B is moved to an opposing side of the shaft member 141 relative to the force B direction in previous examples. Consequently, the translated torque generated about the shaft member 141, in combination with the force A generated by the springs 321 and 322, results in the torque being generated in a direction corresponding to an open state of the information processing apparatus 100.

Figure 13:
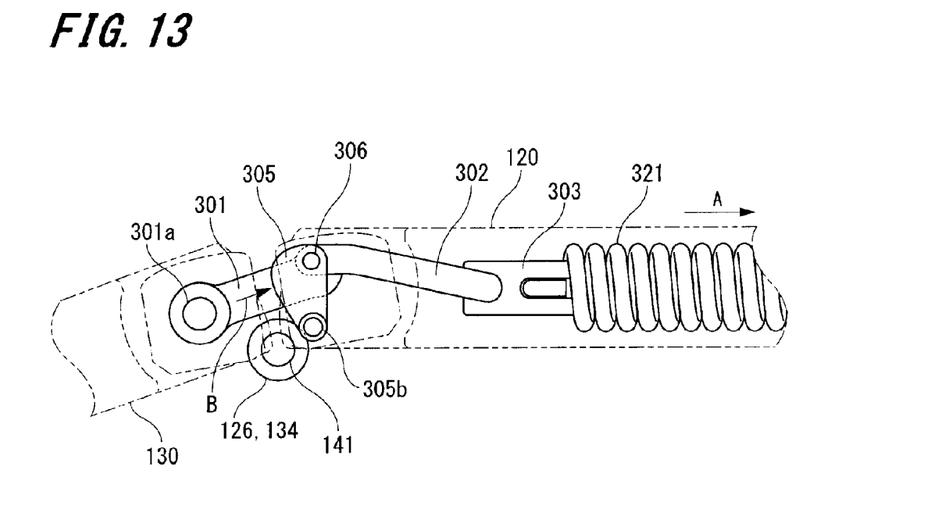

Next, as a further example of generating a torque about the shaft member 141 in an opening direction of the information processing apparatus 100, FIG. 13 illustrates the second case 120 and the third case 130 opened at a polar angle θ of approximately 160°. As illustrated in FIG. 13, the exemplary arrangement shown in the figure results in the force B generated along a longitudinal axis of the first link member 301, and the force A generated by the springs 321 and 322 being translated into a torque about the shaft member 141 such that the information processing apparatus is maintained in an open state. In certain aspects of the present disclosure, the open state of the information processing apparatus corresponds to a 180° polar angle. In other words, the open state, in certain aspects of the present disclosure, results in the information processing apparatus being laid flat such that, e.g., display panels included in one or more of the cases of the information processing apparatus may be viewed concurrently, which thereby increases the overall viewing size of the display panels included in the information processing apparatus 100.

Figure 14:
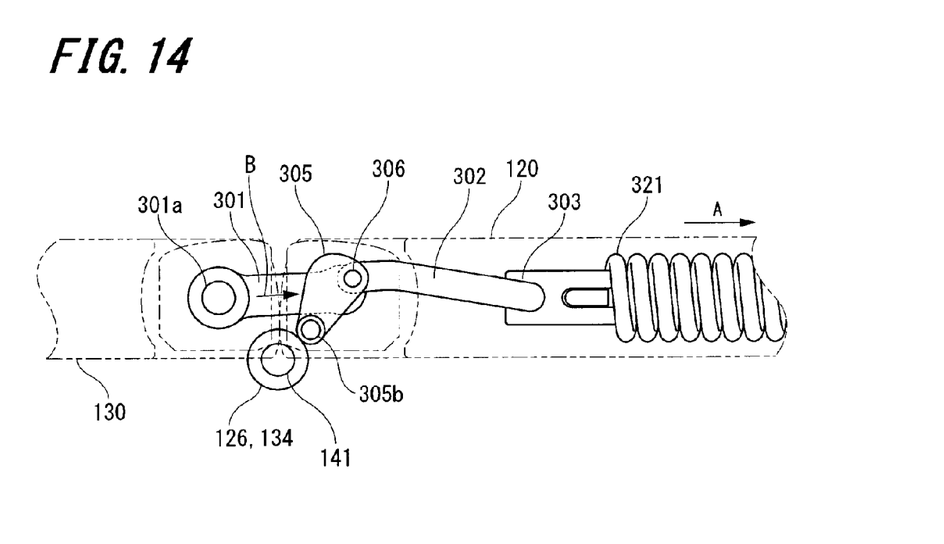

Next, FIG. 14 illustrates an example of the information processing apparatus 100 in an open state. According to the example illustrated in FIG. 14, the open state corresponds to a polar angle between the second case 120 and the third case 130 of approximately 180°. As a result of the second and third cases 120 and 130 transitioning to the open state, the force B generated by the tension exerted upon the first link member 301 in combination with the force A generated by the springs 321 and 322 results in a torque generated about the shaft member 141 in a direction corresponding to the open state. In other words, a combination of the relative positions of the first and second link members with the force generated by the springs 321 and 322 results in a torque generated around the shaft member 141 such that the information processing apparatus 100 is maintained in the open state illustrated in FIG. 14.

As illustrated and discussed in the aforementioned examples, an information processing apparatus according to aspects of the present disclosure may be maintained in one of an open state or a closed state as a result of a torque generated about a shaft member connecting cases of the information processing apparatus. Moreover, connection assemblies including elements that generate the torque around the shaft member may be enclosed within the cases of the information processing apparatus, thereby decreasing the overall necessary size of the information processing apparatus. For example, by including one or more springs in parallel to generate a force for creating the torque, the springs in parallel within the case may decrease the overall size of the case in which the springs are enclosed such that, e.g., the display panel size becomes the limiting factor when choosing case size. Additionally, the exemplary arrangements discussed above provide for the allowance of other elements associated with typical information processing apparatuses, such as speakers, microphones, processing circuitry, communication circuitry, antennas, etc., being housed within the cases of the information processing apparatus (e.g., in an upper or lower end of the cases above or below the display panels).

As one of the ordinary skill will appreciate, while the information processing apparatus 100 discussed in the aforementioned examples is provided with three cases 110, 120, and 130, an information processing apparatus according to the present disclosure may be provided with only two cases. Conversely, an information processing apparatus of the present disclosure may be provided with four or more cases. Additionally, while the connection assemblies 200 and 300 discussed above were arranged in the upper end parts of each of their respective cases, it should be appreciated that the connection parts may be arranged at other positions on the respective cases (e.g., lower end parts 131, 132, and 133). Moreover, while the connection assemblies were provided in the aforementioned examples at the upper end parts of the respective cases, the connection assemblies (e.g., the link members and spring assemblies) may be provided in the lower end parts of the respective cases (connection assemblies 400 and 500), and flexible circuit boards may be provided in the upper connection assemblies. Moreover, in the information processing apparatus 100 discussed in the aforementioned examples, covers 311 and 312 were arranged on an outer side of the first link member 301 and the second link member 302. However, the covers 311 and 312 are optional. That is, in certain embodiments, covers 311 and 312 are not only covers but also guides such that the covers 311 and 312 face each other. Consequently, the position of projections 305a and 305b relative to 304 is determined when the angle between the second case 120 and the third case 130 is determined, which contributes to stabilize the action of the links. Nonetheless, the hinge could work even without this guide if the link lengths are chosen appropriately and therefore, the covers 311 and 312 are still optional as mentioned here.

Furthermore, the spring assemblies discussed in the aforementioned examples include two springs that are arranged in parallel for each assembly. However, one of ordinary skill will appreciate that this is not limiting, and more or less springs may be used to generate a torque around a shaft member as in the present disclosure. Furthermore, while a spring is used to generate a compressive or expansive force, other suitable materials may be utilized to generate such a force (e.g., elastic materials).

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components.

The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) An information processing apparatus comprising: a first case; a second case; and a connection assembly that connects the first case to the second case such that the first and second cases are rotatable about a shaft member disposed in the connection assembly, wherein the connection assembly includes a first link member attached at one end to the first case and at another end to a second link member included in the second case, and a spring assembly attached at one end to the second link member and at another end to the second case, wherein a torque is generated by the connection assembly relative to the shaft member in a direction corresponding to one or more of a closed state and an open state, and the torque is generated in the direction corresponding to the closed state when a front surface of the first case and a front surface of the second case are separated by less than a predetermined polar angle.

(2) The information processing apparatus of (1), wherein the first link member, the second link member, and the spring assembly are disposed within the first and second cases.

(3) The information processing apparatus (1) or (2), wherein the spring assembly includes a plurality of springs arranged in parallel with one another.

(4) The information processing apparatus of any one of (1) to (3), further comprising a plurality of display panels housed in each of the first case and the second case, wherein the display panels are viewable from the respective front surfaces of the first and second cases.

(5) The information processing apparatus of any one of (1) to (4), wherein the connection assembly is disposed in either an upper portion of the cases above the display panels or a lower portion of the cases below the display panels.

(6) The information processing apparatus of any one of (1) to (5), further comprising a flexible circuit board disposed in one of the upper portion or the lower portion of the cases, wherein the flexible circuit board and the connection assembly are disposed on opposing sides of the display panels.

(7) The information processing apparatus of any one of (1) to (6), further comprising: a third case; and a second connection assembly that connects the second and third cases at a side of the second case opposing the connection assembly connecting the first case and the second case, wherein the second connection assembly includes a second shaft member disposed within the second connection assembly such that the second and third cases are rotatable about the second shaft member, a third link member attached at one end to the third case and at another end to the second link member included in the second case, and a second spring assembly attached at one end to the second link member and at another end to the second case.

(8) The information processing apparatus of any one of (1) to (7), wherein the closed state corresponds to a condition in which the front surface of the first case is directly opposing the front surface of the second case such that the predetermined polar angle is substantially zero.

(9) The information processing apparatus of any one of (1) to (8), wherein: the first case and the second case are rotatable up to a predetermined maximum polar angle relative to each other, and the open state corresponds to a condition in which the first case and second case are separated by the predetermined maximum polar angle.

(10) The information processing apparatus of any one of (1) to (9), wherein the predetermined maximum polar angle is 180°.

(11) The information processing apparatus of any one of (1) to (10), wherein: the first link member is pivotable about the first case, and the second link member is pivotable about the second case.

(12) The information processing apparatus of any one of (1) to (11), wherein at least one of the first link member and the second member are configured to move in response to the first case and the second case rotating about the shaft member.

(13) The information processing apparatus of any one of (1) to (12), wherein the direction of the torque is determined by a position of the first link member and the second link member with respect to the shaft member.

(14) The information processing apparatus of any one of (1) to (13), wherein: the first link member pivots about a first point on the first case, the second link member pivots about a second point on the second case, and the direction of the torque is determined by an alignment of the first and second points with respect to the shaft member.

(15) The information processing apparatus of any one of (1) to (14), wherein the alignment of the first and second points with respect to the shaft member changes in response to the first case and the second case rotating about the shaft member.

(16) The information processing apparatus of any one of (1) to (15), wherein a force exerted by the spring assembly changes in response to the first case and the second case rotating about the shaft member.

(17) The information processing apparatus of any one of (1) to (16), wherein the first case and the second case are of substantially equal dimensions.

(18) The information processing apparatus of any one of (1) to (17), further comprising at least one display panel housed in one or more of the first case and the second case, wherein the at least one display panel is viewable from the front surface of the case in which the at least one display panel is housed.

(19) A method of generating a torque about a shaft member connecting a first case and a second case of an information processing apparatus, the method comprising: connecting one end of a first link member to the first case and an opposing end of the first link member to a second link member included in the second case; and connecting one end of a spring assembly to the second case and an opposing end of the spring assembly to the second link member, wherein the torque is generated by a combination of a force exerted by the spring assembly and a position of the first and second link members relative to the shaft member, the torque is generated in a direction corresponding to one or more of a closed state and an open state, and the torque is generated in the direction corresponding to the closed state when a front surface of the first case and a front surface of the second case are separated by less than a predetermined polar angle.

(20) An enclosure apparatus comprising: a first case; a second case; and a connection assembly that connects the first case to the second case such that the first and second cases are rotatable about a shaft member disposed in the connection assembly, wherein the connection assembly includes a first link member attached at one end to the first case and at another end to a second link member included in the second case, and a spring assembly attached at one end to the second link member and at another end to the second case, wherein a torque is generated by the connection assembly relative to the shaft member in a direction corresponding to one or more of a closed state and an open state, and the torque is generated in the direction corresponding to the closed state when a front surface of the first case and a front surface of the second case are separated by less than a predetermined polar angle.

The invention claimed is:

1. An information processing apparatus comprising:
a first case;
a second case;
a first display panel housed in the first case;
a second display panel housed in the second case, wherein the first and second display panels are viewable from the respective front surfaces of the first and second cases; and
a connection assembly that connects the first case to the second case such that the first and second cases are rotatable about a shaft member disposed in the connection assembly, wherein
the connection assembly includes
a first link member attached at one end to the first case and at another end to a second link member included in the second case, and
a spring assembly attached at one end to the second link member and at another end to the second case, wherein
a torque is generated by the connection assembly relative to the shaft member in a direction corresponding to one or more of a closed state and an open state, and
the torque is generated in the direction corresponding to the closed state when a front surface of the first case and a front surface of the second case are separated by less than a predetermined polar angle.

2. The information processing apparatus of claim 1, wherein
the first link member, the second link member, and the spring assembly are disposed within the first and second cases.

3. The information processing apparatus of claim 1, wherein
the spring assembly includes a plurality of springs arranged in parallel with one another.

4. The information processing apparatus of claim 1, wherein
the connection assembly is disposed in either an upper portion of the first and second cases above the first and second display panels or a lower portion of the first and second cases below the first and second display panels.

5. The information processing apparatus of claim 4, further comprising:
a flexible circuit board disposed in one of the upper portion or the lower portion of the first and second cases, wherein the flexible circuit board and the connection assembly are disposed on opposing sides of the first and second display panels.

6. The information processing apparatus of claim 1, wherein
the closed state corresponds to a condition in which the front surface of the first case is directly opposing the front surface of the second case such that the predetermined polar angle is substantially zero.

7. The information processing apparatus of claim 1, wherein:
the first case and the second case are rotatable up to a predetermined maximum polar angle relative to each other, and
the open state corresponds to a condition in which the first case and second case are separated by the predetermined maximum polar angle.

8. The information processing apparatus of claim 7, wherein
the predetermined maximum polar angle is 180°.

9. The information processing apparatus of claim 1, wherein:
the first link member is pivotable about the first case, and
the second link member is pivotable about the second case.

10. The information processing apparatus of claim 1, wherein
at least one of the first link member and the second member are configured to move in response to the first case and the second case rotating about the shaft member.

11. The information processing apparatus of claim 10, wherein
the direction of the torque is determined by a position of the first link member and the second link member with respect to the shaft member.

12. The information processing apparatus of claim 1, wherein
the first case and the second case are of substantially equal dimensions.

13. An information processing apparatus comprising:
a first case;
a second case;
a third case;
a first connection assembly that connects the first case to the second case such that the first and second cases are rotatable about a first shaft member disposed in the first connection assembly, wherein
the first connection assembly includes
a first link member attached at one end to the first case and at another end to a second link member included in the second case, and
a first spring assembly attached at one end to the second link member and at another end to the second case, wherein
a torque is generated by the first connection assembly relative to the first shaft member in a direction corresponding to one or more of a closed state and an open state, and
the torque is generated in the direction corresponding to the closed state when a front surface of the first case and a front surface of the second case are separated by less than a predetermined polar angle; and
a second connection assembly that connects the second and third cases at a side of the second case opposing the first connection assembly connecting the first case and the second case, wherein the second connection assembly includes
- a second shaft member disposed within the second connection assembly such that the second and third cases are rotatable about the second shaft member,
- a third link member attached at one end to the third case and at another end to the second link member included in the second case, and
- a second spring assembly attached at one end to the second link member and at another end to the second case.

14. An information processing apparatus comprising:

a first case;

a second case; and a connection assembly that connects the first case to the second case such that the first and second cases are rotatable about a shaft member disposed in the connection assembly, wherein the connection assembly includes a first link member attached at one end to the first case and at another end to a second link member included in the second case, and a spring assembly attached at one end to the second link member and at another end to the second case, wherein a torque is generated by the connection assembly relative to the shaft member in a direction corresponding to one or more of a closed state and an open state, the torque is generated in the direction corresponding to the closed state when a front surface of the first case and a front surface of the second case are separated by less than a predetermined polar angle, the first link member pivots about a first point on the first case, the second link member pivots about a second point on the second case, and the direction of the torque is determined by an alignment of the first and second points with respect to the shaft member.

15. The information processing apparatus of claim 14, wherein the alignment of the first and second points with respect to the shaft member changes in response to the first case and the second case rotating about the shaft member.

16. The information processing apparatus of claim 15, wherein a force exerted by the spring assembly changes in response to the first case and the second case rotating about the shaft member.

* * * * *